US012559243B2

(12) United States Patent　　　(10) Patent No.: US 12,559,243 B2
Smith　　　　　　　　　　　　　　　　(45) Date of Patent: Feb. 24, 2026

(54) HYBRID-ELECTRIC AIRCRAFT PROPULSION SYSTEM AND METHOD

(71) Applicant: Pratt & Whitney Canada Corp., Longueuil (CA)

(72) Inventor: Michael P. Smith, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 213 days.

(21) Appl. No.: 17/860,722

(22) Filed: Jul. 8, 2022

(65) Prior Publication Data

US 2024/0010346 A1　　Jan. 11, 2024

(51) Int. Cl.
| | |
|---|---|
| B64D 27/33 | (2024.01) |
| B64D 27/02 | (2006.01) |
| B64D 27/04 | (2006.01) |
| B64D 27/10 | (2006.01) |

(52) U.S. Cl.
CPC ........... B64D 27/33 (2024.01); B64D 27/026 (2024.01); B64D 27/04 (2013.01); B64D 27/10 (2013.01)

(58) Field of Classification Search
CPC ...... B64D 27/33; B64D 27/026; B64D 27/02; B64D 27/10; B64D 27/24
See application file for complete search history.

(56) References Cited

U.S. PATENT DOCUMENTS

| | | | |
|---|---|---|---|
| 6,064,122 | A | 5/2000 | McConnell |
| 6,704,625 | B2 | 3/2004 | Albero |
| 7,958,727 | B2 | 6/2011 | Arnold |

| | | | | |
|---|---|---|---|---|
| 2016/0016670 | A1* | 1/2016 | Sautreuil | B64D 27/10 |
| | | | | 903/904 |
| 2018/0251226 | A1* | 9/2018 | Fenny | B64C 29/0033 |
| 2020/0148372 | A1* | 5/2020 | Long | B64D 27/02 |
| 2020/0298988 | A1 | 9/2020 | Latulipe | |
| 2020/0400036 | A1 | 12/2020 | Redford | |
| 2021/0179286 | A1 | 6/2021 | Harvey | |
| 2023/0017954 | A1* | 1/2023 | Allias | B64D 35/08 |
| 2024/0034478 | A1* | 2/2024 | Tabar | B64D 27/10 |
| 2024/0059422 | A1* | 2/2024 | Bertrand | B64D 27/24 |

FOREIGN PATENT DOCUMENTS

GB　　　　　2594072 A　　10/2021

OTHER PUBLICATIONS

EP Search Reported for EP Patent Application No. 23183963.0 dated Dec. 5, 2023.

* cited by examiner

*Primary Examiner* — Joshua J Michener
*Assistant Examiner* — Cindi M Curry
(74) *Attorney, Agent, or Firm* — Getz Balich LLC

(57)　　　　　ABSTRACT

A propulsion system for an aircraft is provided that includes an electric generator, a compressor, an internal combustion (IC) engine, a turbine, an electric power storage unit, and an electric motor. The compressor is configured to selectively produce a flow of compressor air at an air pressure greater than an ambient air pressure. The IC engine is configured to selectively intake compressor air during operation and produce an exhaust gas flow during operation. The turbine, powered by exhaust gas flow, is in communication with and configured to power the compressor and the electric generator. The electric power storage unit is in communication with the electric generator. The electric motor is in communication with the IC engine. The electric motor is powered by the electrical power produced by the electric generator, and the electric motor is configured to selectively provide motive force to the IC engine.

17 Claims, 6 Drawing Sheets

HYBRID-ELECTRIC AIRCRAFT PROPULSION SYSTEM AND METHOD

BACKGROUND OF THE INVENTION

1. Technical Field

The present disclosure relates to hybrid-electric aircraft propulsion systems and methods for operating the same.

2. Background Information

Internal combustion (IC) engines such as a rotary engine (e.g., a Wankel type rotary engine), a reciprocating piston engine, and other constant volume IC engines have been used or proposed as an alternative power source for aircraft; e.g., conventional fixed wing and rotorcraft including helicopters and tiltrotors. There are benefits and disadvantages relating to both IC engines and small gas turbine engines. On the one hand, IC engines are often less expensive than a typical gas turbine engine and can be relatively fuel efficient when compared to a small gas turbine engine. On the other hand, the fuel efficiency of IC engines is often offset by the IC engine having a greater weight than a small gas turbine engine. The performance of an IC engine will likely vary as a function of altitude and an IC engine will likely have an RPM operating band that may not align with the desired rotational speed of a propulsor such as a thrust producing fan or the rotor blades of a rotor craft.

What is needed is a propulsion system that provides an acceptable operating band that accommodates both low thrust operation and high thrust operation and one that provides desirable performance.

SUMMARY

According to as aspect of the present disclosure, a propulsion system for an aircraft is provided that includes an electric generator, a compressor, an internal combustion (IC) engine, a turbine, an electric power storage unit, and an electric motor. The electric generator is configured to produce electrical power. The compressor is configured to selectively produce a flow of compressor air at an air pressure greater than an ambient air pressure. The IC engine is configured to selectively intake the flow of compressor air during operation and produce an exhaust gas flow during operation. The turbine is in communication with and configured to power the compressor and the electric generator. The turbine is powered by the exhaust gas flow. The electric power storage unit is in communication with the electric generator. The electric motor is in communication with the IC engine. The electric motor is powered by the electrical power produced by the electric generator, and the electric motor is configured to selectively provide motive force to the IC engine.

In any of the aspects or embodiments described above and herein, the system may further include a shaft connecting the electric generator, the compressor, and the turbine, wherein the turbine is configured to drive the shaft and thereby drive the compressor.

In any of the aspects or embodiments described above and herein, the system may further include a mechanical power management device (MPMD) in communication with the shaft between the electric generator and the compressor, and the MPMD may be configured to receive an input power and to produce an output power, wherein the input power is different than the output power.

In any of the aspects or embodiments described above and herein, the input power may include a first revolutions per minute (RPM) value and the output power includes a second RPM value, and the first RPM value may be different from the second RPM value.

In any of the aspects or embodiments described above and herein, the system may further include an electric power management control (EPMC) in communication with the electric generator, a motor control in communication with the electric motor, and a system controller in communication with the EPMC, the motor control, and a memory device storing instructions.

In any of the aspects or embodiments described above and herein, the electric generator may be configurable as a motor/generator operable in a first mode or a second mode. In the first mode the motor/generator functions as an electric generator and produces electrical power and in the second mode functions as a second electric motor to provide motive force. The motor control may be configurable to control the motor/generator to selectively operate in the first mode and the second mode, and in the second mode, the motor generator is operable to provide motive force to the compressor.

According to another aspect of the present disclosure a propulsion system for an aircraft is provided that includes an electric generator, a compressor, an internal combustion (IC) engine, a turbine, a mechanical power management device (MPMD), an electric power storage unit, and an electric motor. The electric generator is configured to produce electrical power. The compressor is configured to selectively produce a flow of compressor air at an air pressure greater than an ambient air pressure. The IC engine is configured to selectively intake the flow of compressor air during operation and produce an exhaust gas flow during operation, the IC engine in communication with the MPMD. The turbine is in communication with and configured to power the compressor and the electric generator, wherein the turbine is powered by the exhaust gas flow. The electric power storage unit is in communication with the electric generator. The electric motor in communication with the MPMD, the electric motor powered by the electrical power produced by the electric generator. The IC engine and the electric motor are both configured to selectively provide motive force to the MPMD.

In any of the aspects or embodiments described above and herein, the system may further include an electric power management control (EPMC) in communication with the electric generator, a motor control in communication with the electric motor, and a system controller in communication with the EPMC, the motor control, and a memory device storing instructions.

In any of the aspects or embodiments described above and herein, the electric generator may include a first electric generator and a second electric generator, the compressor may include a first compressor and a second compressor, the turbine may include a first turbine and a second turbine, wherein the first turbine is in communication with and configured to power the first compressor and the first electric generator, and the second turbine is in communication with and configured to power the second compressor and the second electric generator. The system may be configured such that the first compressor, or the second compressor, or both, are configured to produce the flow of compressor air to the IC engine. The system may be configured such that the first turbine, or the second turbine, or both, are configured to be powered by the exhaust gas flow from the IC engine. The electric motor may include a first electric motor and a second electric motor. The first electric motor may be powered by the electrical power produced by the first electric generator, or the first electric motor may be powered by the electrical power produced by the second electric generator, or the first electric motor may be powered by the electrical power produced by both the first electric generator and the second electric generator.

In any of the aspects or embodiments described above and herein, the IC engine, the first electric motor, and the second electric motor may be configured to selectively provide motive force to the MPMD.

According to another aspect of the present disclosure, an aircraft is provided that includes a fuselage, at least one nacelle, at least one propulsor, and at least one propulsion system for driving the propulsor. The propulsion system includes an electric generator, a compressor, an internal combustion (IC) engine, a turbine, an electric power storage unit, and an electric motor. The electric generator is configured to produce electrical power. The compressor is configured to selectively produce a flow of compressor air at an air pressure greater than an ambient air pressure. The IC engine is configured to selectively intake the flow of compressor air during operation and produce an exhaust gas flow during operation, and the IC engine is in communication with a mechanical power management device (MPMD). The turbine is in communication with and configured to power the compressor and the electric generator, wherein the turbine is powered by the exhaust gas flow. The electric power storage unit is in communication with the electric generator. The electric motor is in communication with the MPMD. The electric motor is powered by the electrical power produced by the electric generator. The IC engine and the electric motor are both configured to selectively provide motive force to the MPMD and the (MPMD) provides motive force to the propulsor.

According to another aspect of the present disclosure, a method for providing motive force for an aircraft is provided that includes the steps of: a) operating a compressor to produce a flow of compressor air at an air pressure greater than an ambient air pressure; b) operating an internal combustion (IC) engine configured to selectively intake the flow of compressor air during operation and produce an exhaust gas flow during operation; c) operating a turbine powered by the exhaust gas flow, the turbine in communication with the compressor and in selective communication with an electric generator, the electric generator configured to produce electrical power; and d) selectively operating an electric motor in communication with the IC engine, the electric motor powered by the electrical power produced by the electric generator, and the electric motor configured to selectively provide motive force to the IC engine.

In any of the aspects or embodiments described above and herein, the electric generator is configurable as a motor/generator operable in a first mode and a second mode, and the method further includes selectively operating the motor/generator in the first mode to function as said electric generator and produce the electrical power, or in the second mode to function as a second electric motor to provide motive force to the compressor, and wherein in the second mode the motor/generator is powered by an electric power storage unit.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
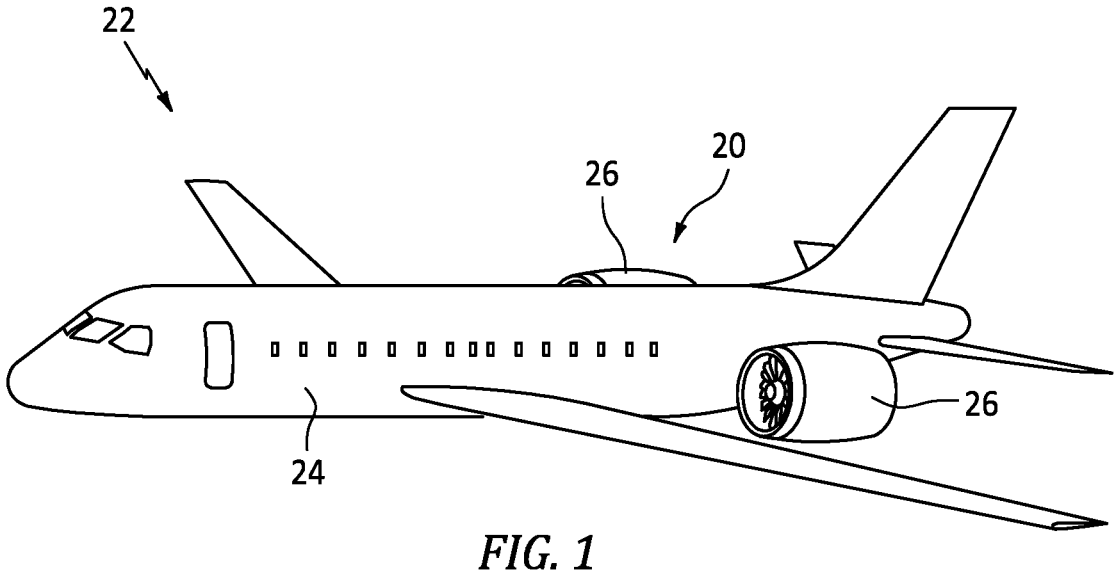
FIG. 1 is a diagrammatic perspective view of an aircraft.

Referring to the FIGS. 1-5, aspects of the present disclosure include an aircraft propulsion system 20, an aircraft 22 that utilizes the present disclosure system, and a method for operating the same. FIG. 1 illustrates a conventional fixed wing aircraft 22 that may utilize embodiments of the present disclosure system 20. The aircraft 22 may include a fuselage 24 and at least one propulsion nacelle 26. As described herein, the present disclosure is not limited to conventional fixed wing aircraft, and may be utilized in a rotorcraft such as a helicopter or a tiltrotor.

Embodiments of the aircraft propulsion system include components such as an internal combustion (IC) engine, a fan, at least one turbine, at least one compressor, at least one electric generator, at least one electric motor, and at least one electric power storage unit. In some embodiments, the system may include a system controller in communication with various components within the system. The present disclosure aircraft propulsion system contemplates several different configurations that may include one or more than one of each of the aforesaid components.

The IC engine (e.g., an internal combustion engine characterized by periodic ignition of fuel and air) may be a Wankel type rotary engine, or a reciprocating piston engine, or other type of constant volume IC engine or rotating detonation engine that powers a rotating output shaft. The present disclosure is not limited to any particular type of IC engine. The IC engine may be configured to combust a variety of different fuels (e.g., hydrocarbon based fuel, hydrogen, or the like) and is not limited to any particular type of fuel. During operation, the IC engine intakes air and fuel and combusts the mixture of air and fuel to produce power. The combustion of the air/fuel mixture produces exhaust gases.

The IC engine utilizes a cooling system that includes at least one heat exchanger, coolant piping, and a coolant fluid. The coolant piping (e.g., including one or more pumps, fluid piping, valves, sensors, etc.) permits fluid communication of coolant between the IC engine and the heat exchanger. The heat exchanger is configured to transfer thermal energy from the IC engine coolant to a second fluid (e.g., ambient air at a lower temperature) during operation of the system. The present disclosure is not limited to any particular type of cooling system, and may use combinations of different types of heat exchangers and different fluids passing through a respective heat exchanger. The coolant may be glycol, or a glycol/water mixture, or other known coolant.

The at least one turbine may be a scroll type turbine (i.e., a "turbine scroll") or an axial-type turbine (e.g., a rotor having a hub with a plurality of turbine blades extending radially out from the hub). The turbine may be a single stage turbine or may have a plurality of turbine stages. As will be explained below, a source of gas (e.g., exhaust gases from the IC engine) at an elevated temperature and pressure provide the motive force to power the turbine.

The at least one compressor may be a scroll type compressor (i.e., a "compressor scroll") or an axial-type compressor (e.g., a rotor having a hub with a plurality of compressor blades extending radially out from the hub). The compressor may be a single stage compressor or may have a plurality of compressor stages. As will be explained below, ambient air ("inlet air") may be drawn into the compressor where it is worked to increase the pressure and temperature of the air. In some embodiments, a heat exchanger may be used to decrease the temperature of the compressed air prior to entry into the IC engine.

The system may include or be configured to drive one or more propulsors to provide propulsive force to the aircraft. An example of a propulsor is a fan configured for rotation about a rotational axis. Rotation of the fan about the rotational axis in a predetermined direction (e.g., either clockwise or counterclockwise) produces thrust that can be used to translationally power the aircraft. Another example of a propulsor is a plurality of rotary blades such as those used in a helicopter application.

An electric generator(s) utilized in the present system may be configured to be rotationally driven and to produce electrical power. An electric generator employed within the system may incorporate controls (e.g., hardware, or control logic, or any combination thereof) to permit management of the electrical power produced by the generator to the system. Alternatively, as shown in FIGS. 2-6, at least some of such power management controls ("EPMC") may be disposed separately from the generator. The EPMC may include power conversion (e.g., DC to AC), signal conditioning, etc. to facilitate the production of power in a form that is acceptable for other components (e.g., electric motors) within the system. The system embodiments diagrammatically shown in FIGS. 2-5 include a single electric generator. The present disclosure system is not limited to any particular number of generators. As described herein, in some embodiments an electric generator within the present system may also be controlled to operate an as electric motor.

An electric motor(s) utilized within the present system may be configured to be rotationally driven by electrical power produced directly or indirectly by the electric generator(s) and/or by the electric power storage unit. In some embodiments, the electric motor may be in communication with a motor control that includes hardware, or control logic, or any combination thereof to facilitate operation/control of the electric motor. In the Figures, the motor control is shown as independent of the electric motor. An independent motor control is not required; e.g., the motor control may be integrally included in the electric motor. In some embodiments, electrical power for powering the electric motor may pass through (e.g., be conditioned by) the EPMC, then through the motor control before being delivered to the electric motor.

One or more mechanical power management devices ("(MPMD)") configured to receive a power input (e.g., RPMs, torque, etc.) and to produce a power output different from the power input (e.g., change in RPM, etc.) may be disposed between system components; e.g., between the turbine and compressor, between the compressor and generator, between the electric motor and the IC engine, between the IC engine and the propulsor, etc. Non-limiting examples of a MPMD include a reduction gear box (RGB), or a variable speed drive (VSD), clutch, or the like. In some embodiments, a (MPMD) may also be configured to selectively disengage the components from one another; e.g., disconnect the electric generator from the turbine.

The electric power storage unit is configured to store electrical power produced within the system and to produce that stored power upon demand by the system. An electric power storage unit may include one or more batteries. The electric power storage unit may be in communication with the EPMC for managing the released electric power.

Embodiments of the present disclosure aircraft propulsion system 20 may include a system controller in communication with system components, including one or more of the electric motor, compressor, EPMC, MPMD, IC engine cooling system 32, electric generator, turbine, electric power storage unit, IC engine, and various other components to control and or receive signals therefrom to perform the functions described herein. The system controller may assume a variety of different configurations and may be disposed in various locations within the aircraft. The system controller may include any type of computing device, computational circuit, processor(s), CPU, computer, or the like capable of executing a series of instructions that are stored in memory. In some embodiments, the system controller may include a plurality of controllers (e.g., each including a computing device or the like) each associated with one or more components within the system for control thereof. In some embodiments, those respective controllers may communicate with one another and thereby may collectively form the system controller, and/or subordinate controllers may communicate with a dominant controller. The present disclosure is not limited to any particular control architecture. The instructions executable by a controller may include an operating system, and/or executable software modules such as program files, system data, buffers, drivers, utilities, and the like. The executable instructions may apply to any functionality described herein to enable the system to accomplish the same algorithmically and/or coordination of system components. The system controller may include a single memory device or a plurality of memory devices and the present disclosure is not limited to any particular type of memory device.

In some embodiments, the system controller, the EPMC, and the motor control are independent of one another. In some embodiments, one or both of the EPMC and the motor control may be integral with the system controller.

As stated above, the present disclosure aircraft propulsion system 20 contemplates several different configurations that may include one or more than one of the aforesaid components. Non-limiting examples of those configurations are provided below to illustrate the utility of the present disclosure.

Figure 2:
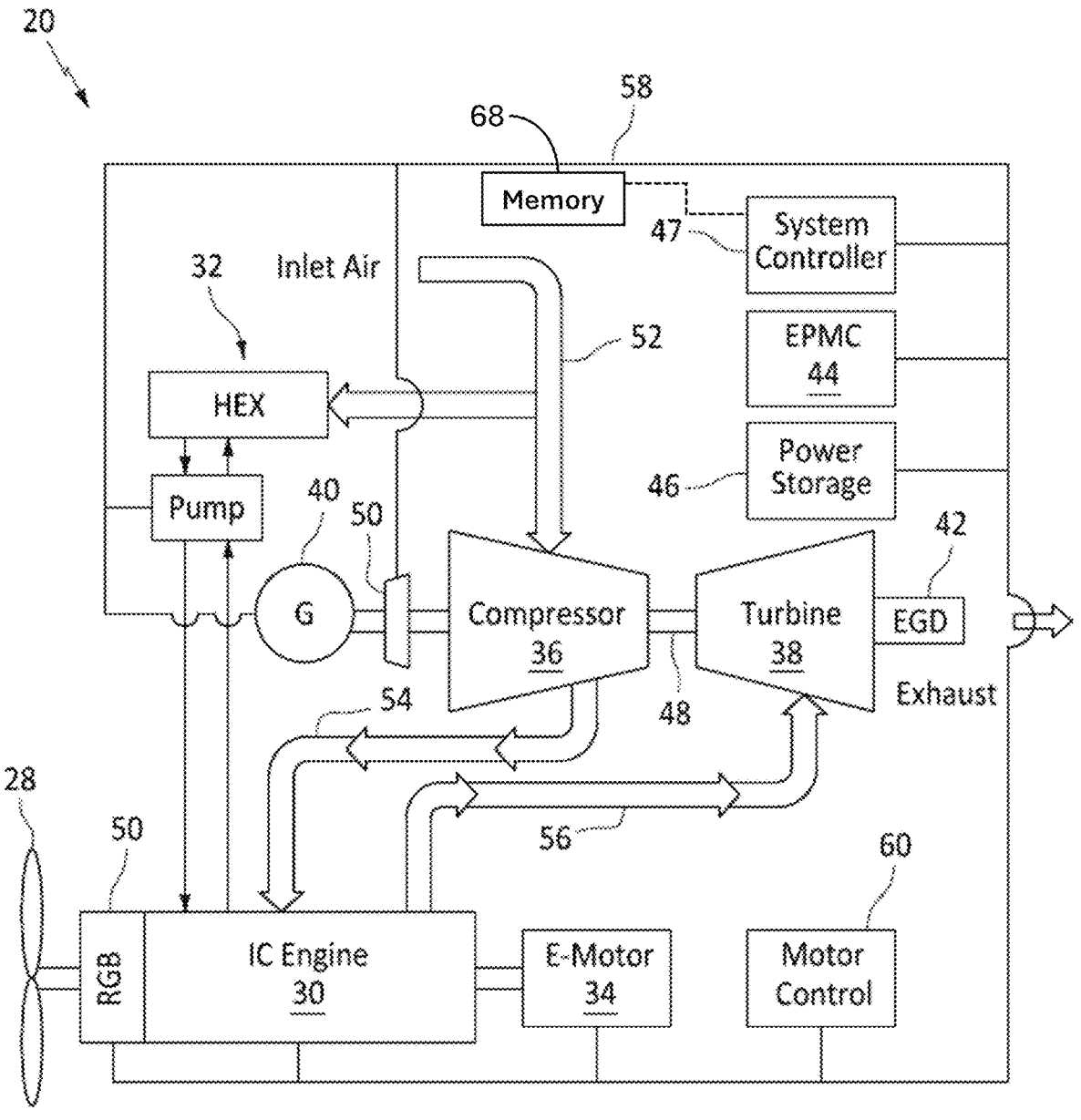
FIG. 2 is a diagrammatic view of a present disclosure system embodiment.

Referring to FIG. 2, an exemplary embodiment of a present disclosure aircraft propulsion system 20 is diagrammatically shown. This embodiment includes a propulsor 28 (shown as a fan or propeller for illustrative sake only), an IC engine 30, an IC engine cooling system 32, an electric motor 34, a compressor 36, a turbine 38, an electric generator 40, an exhaust gas device (EGD) 42, an EPMC 44, an electric power storage unit 46, and a system controller 47. The system controller 47 may include memory 68, which may be a single memory device or a plurality of memory devices.

System components may be disposed in the fuselage of an aircraft 22 or may be disposed in a nacelle 26 type structure. The present disclosure is not limited to any particular system configuration within an aircraft other than as described herein.

In the embodiment shown in FIG. 2, the turbine 38 may be configured to drive a shaft 48 in communication with the compressor 36 and the electric generator 40. The shaft 48 may be a unitary structure in communication with the compressor 36 and the electric generator 40, or it may comprise a plurality of sub shafts; e.g., a first sub shaft placing the turbine 38 in communication with the compressor 36, and a second sub shaft placing the compressor 36 in communication with the electric generator 40. The shaft arrangement between the turbine 38, compressor 36, and electric generator 40 may assume a variety of different configurations and the present disclosure is not limited to any particular shaft arrangement. An MPMD 50 (e.g., an RGB, VSD, clutch, etc.) configured to receive a power input and to produce a power output may be disposed between the turbine 38 and the compressor 36 and/or between the compressor 36 and the electric generator 40. In some embodiments, the power output of the MPMD 50 may be different from the power input into the MPMD 50; e.g., a change in RPM, etc. In some embodiments, the (MPMD) 50 may be controllable to disconnect the component driving the MPMD 50 from the component being driven by the MPMD 50. For example, an MPMD 50 disposed between the turbine 38 (driving component) and the electric generator 40 (driven component) may be controllable to mechanically disconnect the electric generator 40 from the turbine 38; e.g., the MPMD 50 may function as a clutch operable to selectively disconnect the turbine 38 from the electric generator 40 in the event of an electric generator 40 failure, or in instances wherein electric generator power production is unnecessary. FIG. 2 diagrammatically illustrates an MPMD 50 (e.g., a clutch) disposed between the compressor 36 and the electric generator 40. The present disclosure does not require MPMD 50, and if included is not limited to any particular arrangement of MPMDs 50.

The electric motor 34 directly or indirectly communicates with the IC engine 30. Indirect communication may include an MPMD 50 like that described above. As stated above, an MPMD 50 (e.g., an RGB, or a VSD, clutch, or the like) may be disposed between the electric motor 34 and the IC engine 30 to alter the electric motor 34 input (e.g., RPMs) to the IC engine 30, or to selectively disengage the electric motor 34 from the IC engine 30.

The IC engine 30 directly or indirectly communicates with the propulsor 28. Indirect communication may include an MPMD 50 like that described above. FIG. 2 diagrammatically illustrates an RGB disposed between the IC engine 30 and the propulsor 28. The MPMD 50/RGB may be configured to power the propulsor 28 at a different RPM that the input RPM into the MPMD 50/RGB. The present disclosure is not limited to any particular arrangement of MPMDs 50.

Inlet air ducting 52 provides a conduit for ambient air to be passed from an air inlet to the compressor 36 and compressed air ducting 54 from the compressor 36 to the IC engine 30. Exhaust air ducting 56 provides a conduit for IC engine 30 exhaust gases to be passed from the IC engine 30 to the turbine 38.

In the operation of this system embodiment, ambient air entering the system 20 via inlet air ducting 52 passes through the compressor 36, or is bypassed around the compressor 36, or some combination thereof, and is then passed via compressed air ducting 54 to the IC engine 30 and mixed with fuel and ignited. In those instances when the compressor 36 is operating, the ambient air is worked to a higher than ambient pressure and temperature. In some embodiments, a heat exchanger (not shown) may be used to decrease the temperature of the compressed air prior to entry into the IC engine 30. The ignited fuel mixture causes an output shaft of the IC engine 30 to rotate and exhaust gases are produced. The exhaust gases are passed to the turbine 38 via exhaust air ducting 56, or bypassed around the turbine 38, or some combination thereof. In those instances when exhaust gases are directed into the turbine 38, the exhaust gases cause one or more rotary stages within the turbine 38 to rotate, and thereby cause the shaft 48 extending between the turbine 38 and the compressor 36 to rotate. As a result, the turbine 38 drives the compressor 36 and/or the electric generator 40. The exhaust gases exit the turbine 38 and pass through the EGD 42 (e.g., a muffler, nozzle, or the like). In some applications, the EGD 42 may be configured to provide propulsive force (e.g., thrust).

The turbine 38 may also drives the electric generator 40 and, in turn, the electric generator 40 produces electrical power and the system 20 is configured to provide that generated electrical power to other components within the system 20. In the system 20 configuration diagrammatically shown in FIG. 2, electrical power produced by the electric generator 40 is transferred to a link bus 58 (or other power transmission device) that places the electric generator 40 in electrical communication with the other system components. In the non-limiting embodiment shown in FIG. 2, electrical power produced by the electric generator 40 is transferred to the EPMC 44 for management into a form acceptable for use by other system components. The electric power produced by the electric generator 40 may be transferred directly to the electric power storage unit 46 or power may be transferred to the electric power storage unit 46 after passing through the EPMC 44 for selective charging of the electrical power storage unit 46. In the event the electric power storage unit 46 is fully charged, the bus 58 may be configured to selectively permit the produced power to bypass the electrical power storage unit 46. The EPMC 44 may be controlled by stored instructions executable by the system controller 47.

The electric motor 34 receives electrical power from the EPMC 44 via a motor control 60. The motor control 60 may include hardware, control logic, or any combination thereof to facilitate operation/control of the electric motor 34. The electric motor 34 may be in direct communication with IC engine 30 or in indirect communication via an MPMD 50. Motive force produced by the electric motor 34 is transferred to the IC engine 30. The electric motor 34 powered by the electric generator 40 may be controlled to add motive force to the IC engine 30 and thereby increase the output and/or the efficiency of the IC engine 30. In some embodiments, the electric motor 34 may be powered by the electric power storage unit 46 to start the IC engine 30.

The operation of the above described system 20 embodiment may vary during portions of an aircraft flight program performed by an aircraft 22. For example, during certain portions of an aircraft flight program, it may be desirable to operate the electric motor 34 to provide more or less motive force to the IC engine 30, or provide no motive force to the IC engine 30 to achieve the required system motive force and/or desirable efficiency, depending on conditions such as and not limited to atmospheric pressure, engine rotational speed, ram effects, engine power, etc. In similar fashion, during certain portions of an aircraft flight program, it may be desirable to operate the electric generator 40 to provide more or less electric power, or provide no electric power. Stored instructions executable by the system controller 47 can be used to control the various system components to produce the desired operation.

Figure 3:
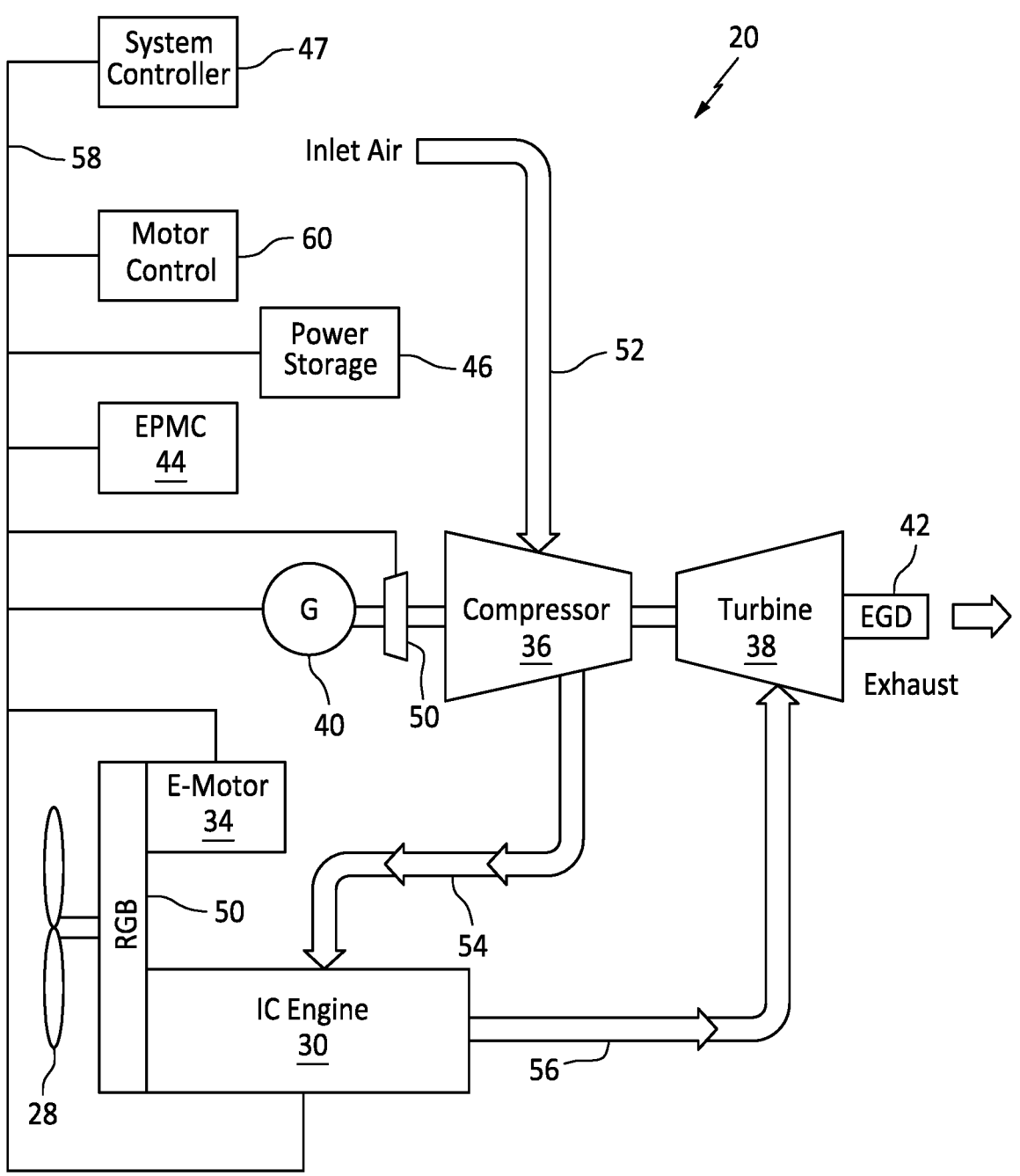
FIG. 3 is a diagrammatic view of a present disclosure system embodiment.

Now referring to FIG. 3, another exemplary embodiment of a present disclosure aircraft propulsion system 20 is diagrammatically shown. This embodiment is similar to the embodiment described above with respect to FIG. 2 except in this embodiment the electric motor 34 is not in communication with the IC engine 30, but rather both the IC engine 30 and the electric motor 34 are in communication with a MPMD 50 (e.g., an RBG). Both the IC engine 30 and the electric motor 34 provide motive force to the MPMD 50 and the MPMD 50 in turn provides motive force to the propulsor 28. FIG. 3 does not show an IC engine cooling system 32, but the system may include an IC engine cooling system 32 like that described herein and shown diagrammatically in FIG. 2. Some embodiments of a system 20 like that shown in FIG. 3 may include an (MPMD) 50 disposed between the turbine 38 (driving component) and the electric generator 40 (driven component); e.g., the (MPMD) 50 may function as a clutch operable to selectively disconnect the turbine 38 from the electric generator 40 in the event of an electric generator 40 failure, or in instances wherein electric generator power production is unnecessary.

Figure 4:
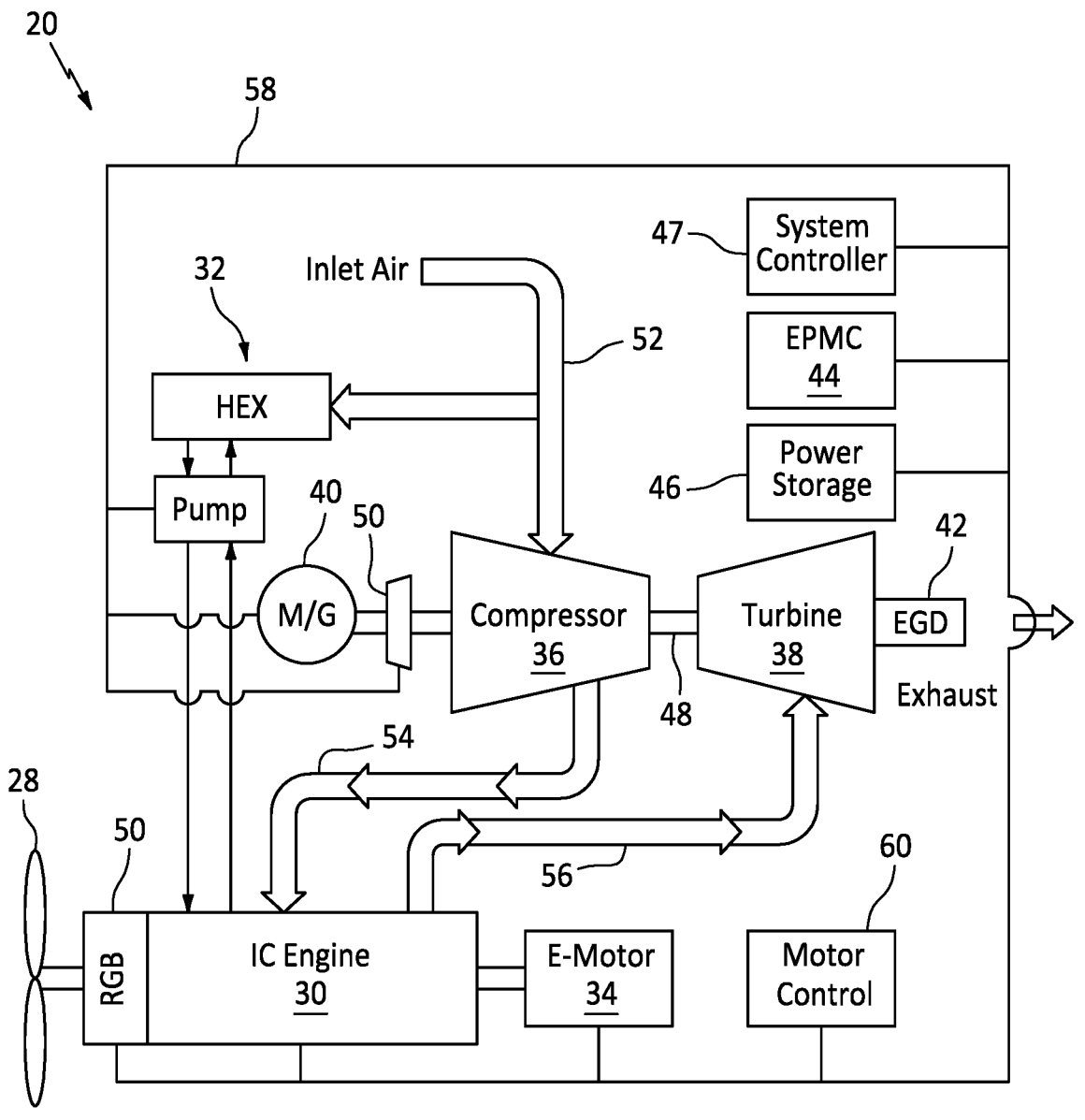
FIG. 4 is a diagrammatic view of a present disclosure system embodiment.

Now referring to FIG. 4, another exemplary embodiment of a present disclosure aircraft propulsion system 20 is diagrammatically shown. This embodiment is similar to the embodiment described above with respect to FIG. 2 except in this embodiment the electric generator 40 (labeled "M/G") is controllable to function as either an electric generator or as an electric motor. When the M/G is configured to function as an electric generator 40, the system operates as described above in the system diagrammatically shown in FIG. 2. When the M/G is configured to function as an electric motor 34 (e.g., powered from electric power stored in the electric power storage unit 46), the M/G provides motive force for driving the compressor 36. Hence, in this embodiment the turbine 38 and/or the M/G may provide motive force to drive the compressor 36. The motive power provided by the M/G can be used, for example, to augment the motive force provided to the compressor 36 by the turbine 38 during peak power portions of the aircraft flight program. In addition or alternatively, the M/G can be used to drive the compressor 36 during start-up of the IC engine 30; e.g., before exhaust gases from the IC engine 30 are appreciably available to power the turbine 38, the M/G can be used to power the compressor 36 to increase the pressure of the air fed into the IC engine 30 to assist in the start-up process of the IC engine 30. FIG. 4 does not show an IC engine cooling system 32, but the system may include an IC engine cooling system 32 like that described herein and shown diagrammatically in FIG. 2. Some embodiments of a system 20 like that shown in FIG. 4 may include an MPMD 50 disposed between the turbine 38 and the M/G 40; e.g., the MPMD 50 may function as a clutch operable to selectively disconnect the turbine 38 from the M/G 40 in the event of an M/G 40 failure, or in instances wherein M/G power production is unnecessary, or when the M/G is transitioning from functioning as an electric motor to functioning as an electric generator or vice versa.

Figure 5:
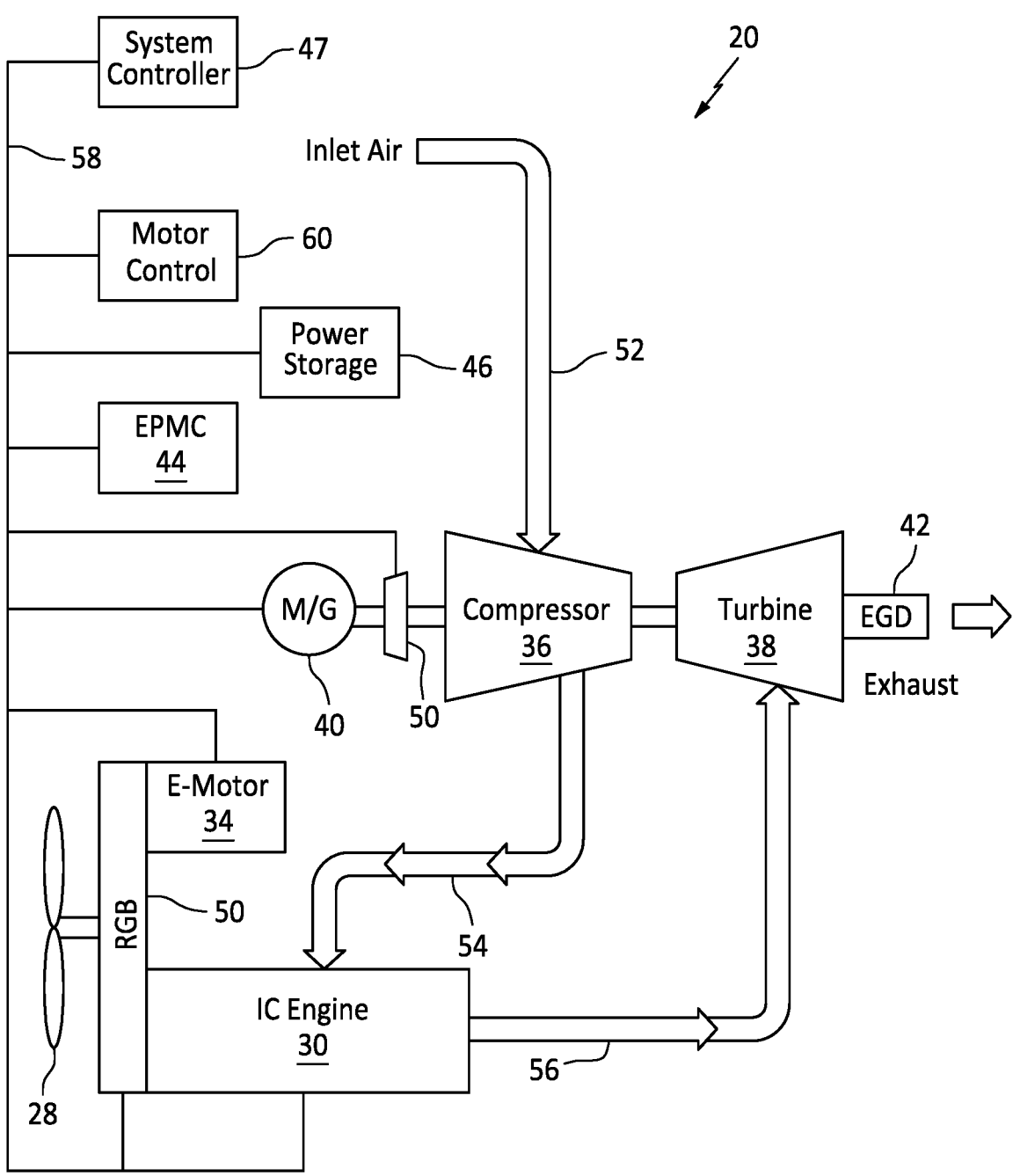
FIG. 5 is a diagrammatic view of a present disclosure system embodiment.

Now referring to FIG. 5, another exemplary embodiment of a present disclosure aircraft propulsion system 20 is diagrammatically shown. This embodiment is similar to the embodiment described above with respect to FIG. 3 except in this embodiment the electric generator 40 (labeled "M/G") is controllable to function as either an electric generator or as an electric motor 34. When the M/G is configured to function as an electric generator 40, the system operates as described above in the system diagrammatically shown in FIG. 3. When the M/G is configured to function as an electric motor 34 (e.g., powered from electric power stored in the electric power storage unit 46), the M/G provides motive force for driving the compressor 36. Hence, in this embodiment the turbine 38 and/or the M/G may provide motive force to drive the compressor 36. The motive power provided by the M/G can be used, for example, to augment the motive force provided to the compressor 36 by the turbine 38 during peak power portions of the aircraft flight program. In addition or alternatively, the M/G can be used to drive the compressor 36 during start-up of the IC engine 30; e.g., before exhaust gases from the IC engine 30 are appreciably available to power the turbine 38, the M/G can be used to power the compressor 36 to increase the pressure of the air fed into the IC engine 30 to assist in the start-up process of the IC engine 30. FIG. 5 does not show an IC engine cooling system 32, but the system may include an IC engine cooling system 32 like that described herein and shown diagrammatically in FIG. 2. Some embodiments of a system 20 like that shown in FIG. 5 may include an MPMD 50 disposed between the turbine 38 and the M/G 40; e.g., the MPMD 50 may function as a clutch operable to selectively disconnect the turbine 38 from the M/G 40 in the event of an M/G 40 failure, or in instances wherein M/G power production is unnecessary, or when the M/G is transitioning from functioning as an electric motor to functioning as an electric generator or vice versa.

Figure 6:
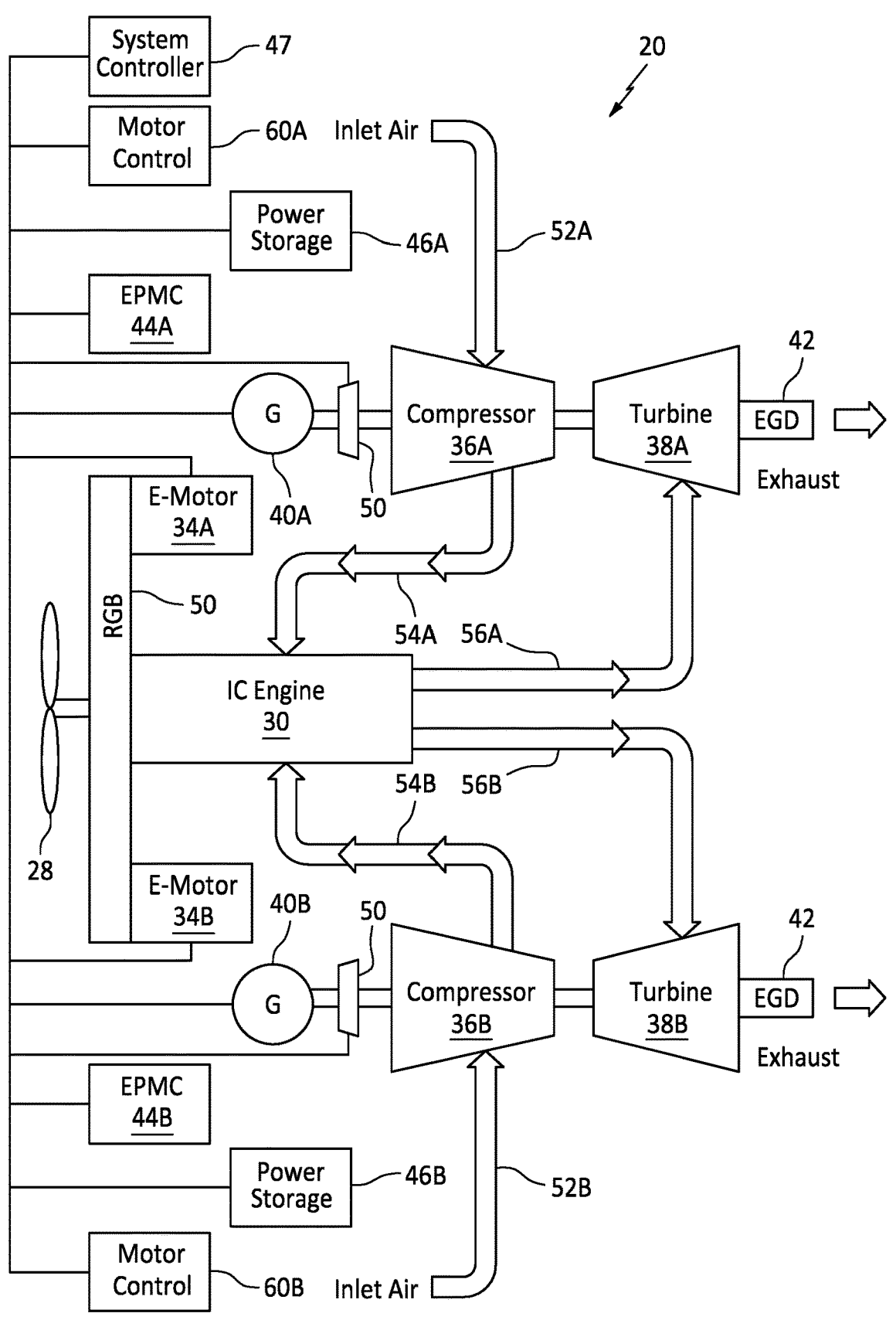
FIG. 6 is a diagrammatic view of a present disclosure system embodiment.

The system embodiments shown above in FIGS. 2-5 illustrate embodiments having a single compressor 36 and turbine 38 arrangement for driving the electric generator 40 and a single electric motor 34 for providing motive force directly or indirectly to the IC engine 30, or for providing additional motive force to a propulsor 28, and may include an electric generator 40 ("M/G") controllable to function as either an electric generator or as an electric motor 34. Further embodiments of the present disclosure may include an additional compressor and turbine arrangement for driving an additional electric generator 40 and an additional electric motor 34 for providing motive force directly or indirectly to the IC engine 30, or for providing additional motive force to a propulsor 28, and may include an additional electric generator 40 ("M/G") controllable to function as either an electric generator or as an electric motor. FIG. 6 illustrates a non-limiting example of such a system 20. This example is similar to the system configuration described above and shown in FIG. 3, now including a single IC engine 30, first and second compressors 36A, 36B, first and second turbines 38A, 38B, first and second electric generators 40A, 40B, and first and second electric motors 34A, 34B. FIG. 6 shows the system further includes first and second EPMCs 44A, 44B, first and second motor controls 60A, 60B, and first and second electric power storage units 46A, 46B. A single EPMC 44, or a single motor control 60, or a single electric power storage unit 46 may be used alternatively. In this embodiment, operation of the system 20 is similar to that described above and shown in FIG. 3; e.g., ambient air may enter an inlet 52A, 52B, be compressed within the first or second compressor 36A, 36B, and be passed via compressed gas ducting 54A, 54B to the IC engine 30. Exhaust gas from the IC engine 30 may be passed via exhaust gas ducting 56A to the first turbine 38A for powering the first compressor 36A and the first electric generator 40A, and may be passed via exhaust gas ducting 56B to the second turbine 38B for powering the second compressor 36B and the second electric generator 40B. Electric power produced by the first and second electric generators 40A, 40B can be provided to the first and second electric motors 34A, 34B. An advantage of this "dual" configuration is the redundancy it provides; e.g., if the first or second electric generator 40A, 40B becomes inoperative, the other of the first or second electric generator 40A, 40B can provide electric power to the system 20. Here again, an MPMD 50 may be disposed between the turbine 38 and the M/G 40 on either side of the system 20 to provide the functionality described above.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the system comprising:
   an electric generator configured to produce electrical power;
   a compressor configured to selectively produce a flow of compressor air at an air pressure greater than an ambient air pressure;
   an internal combustion (IC) engine configured to selectively intake the flow of compressor air during operation and produce an exhaust gas flow during operation;
   a turbine in communication with and configured to power the compressor and the electric generator, wherein the turbine is powered by the exhaust gas flow;
   a shaft connecting the electric generator, the compressor, and the turbine, wherein the turbine is configured to drive the shaft and thereby drive the compressor, the compressor between the turbine and the electric generator;
   a mechanical power management device (MPMD) disposed between the electric generator and the compressor, the MPMD in communication with the shaft, and the MPMD configured to receive an input power and to produce an output power, wherein the input power is different than the output power;
   an electric power storage unit in communication with the electric generator;
   an electric motor in communication with the IC engine, the electric motor powered by the electrical power produced by the electric generator, and the electric motor configured to selectively provide motive force to the IC engine; and
   an electric power management control (EPMC) configured to receive the electrical power from the electric generator and selectively distribute the electrical power to at least one of the electric power storage unit or the electric motor.

2. The system of claim 1, wherein the input power includes a first revolutions per minute (RPM) value and the output power includes a second RPM value, and the first RPM value is different from the second RPM value.

3. The system of claim 1, further comprising:
   a motor control in communication with the electric motor; and
   a system controller in communication with the EPMC, the motor control, and a memory device storing instructions.

4. The system of claim 1, wherein the electric generator is configurable as a motor/generator, and said motor/generator is configurable in a first mode or a second mode, wherein in the first mode the motor/generator functions as said electric generator and produces the electrical power and in the second mode functions as a second electric motor to provide motive force; and wherein a motor control is configurable to control the motor/generator to selectively operate in the first mode and the second mode, and in the second mode, the motor/generator is operable to provide motive force to the compressor.

5. The system of claim 1, wherein the mechanical power management device is configurable to selectively disconnect the turbine from the electric generator.

6. A propulsion system for an aircraft, the system comprising:

an electric generator configured to produce electrical power;

a compressor configured to selectively produce a flow of compressor air at an air pressure greater than an ambient air pressure;

an internal combustion (IC) engine configured to selectively intake the flow of compressor air during operation and produce an exhaust gas flow during operation, the IC engine in communication with a mechanical power management device (MPMD);

a turbine in communication with and configured to power the compressor and the electric generator, wherein the turbine is powered by the exhaust gas flow, the turbine configured to drive a shaft in communication with the electric generator and the compressor;

the compressor disposed between the turbine and the electric generator, and the MPMD disposed between the electric generator and the compressor;

an electric power storage unit in communication with the electric generator;

an electric motor in communication with the MPMD, the electric motor powered by the electrical power produced by the electric generator; and an electric power management control (EPMC) configured to receive the electrical power from the electric generator and selectively distribute the electrical power to at least one of the electric power storage unit or the electric motor;

wherein the IC engine and the electric motor are both configured to selectively provide motive force to the MPMD.

7. The system of claim 6, further comprising a shaft connecting the electric generator, the compressor, and the turbine, wherein the turbine is configured to drive the shaft and thereby drive the compressor.

8. The system of claim 6, further comprising:

a motor control in communication with the electric motor; and a system controller in communication with the EPMC, the motor control, and a memory device storing instructions.

9. The system of claim 6, wherein the electric generator is configurable as a motor/generator, and as said motor/generator configurable in a first mode to function as said electric generator and produce the electrical power and in a second mode to function as an electric motor to provide motive force; and wherein a motor control is configurable to control the motor/generator to selectively operate in the first mode and the second mode, and in the second mode, the motor/generator is operable to provide motive force to the compressor.

10. The system of claim 6, wherein the electric generator includes a first electric generator and a second electric generator; and wherein the compressor includes a first compressor and a second compressor; and wherein the turbine includes a first turbine and a second turbine, and the first turbine is in communication with and configured to power the first compressor and the first electric generator, and the second turbine is in communication with and configured to power the second compressor and the second electric generator; and wherein the system is configured such that the first compressor, or the second compressor, or both, are configured to produce the flow of compressor air to the IC engine; and wherein the system is configured such that the first turbine, or the second turbine, or both, are configured to be powered by the exhaust gas flow from the IC engine; and the electric motor includes a first electric motor and a second electric motor, and the first electric motor is powered by the electrical power produced by the first electric generator, or the first electric motor is powered by the electrical power produced by the second electric generator, or the first electric motor is powered by the electrical power produced by both the first electric generator and the second electric generator.

11. The system of claim 10, wherein the IC engine, the first electric motor, and the second electric motor are configured to selectively provide motive force to the MPMD.

12. An aircraft, comprising:

a fuselage;

at least one nacelle;

a propulsor;

at least one propulsion system for driving the propulsor, the propulsion system having:

an electric generator configured to produce electrical power;

a compressor configured to selectively produce a flow of compressor air at an air pressure greater than an ambient air pressure;

an internal combustion (IC) engine configured to selectively intake the flow of compressor air during operation and produce an exhaust gas flow during operation, the IC engine in communication with a mechanical power management device (MPMD);

a turbine in communication with and configured to power the compressor and the electric generator, wherein the turbine is powered by the exhaust gas flow;

the compressor disposed between the turbine and the electric generator;

an electric power storage unit in communication with the electric generator;

an electric motor in communication with the MPMD, the electric motor powered by the electrical power produced by the electric generator; and an electric power management control (EPMC) configured to receive the electrical power from the electric generator and selectively distribute the electrical power to at least one of the electric power storage unit or the electric motor;

wherein the IC engine and the electric motor are both configured to selectively provide motive force to the MPMD and the MPMD provides motive force to the propulsor.

13. The aircraft of claim 12, wherein the propulsion system further comprises a shaft connecting the electric generator, the compressor, and the turbine, wherein the turbine is configured to drive the shaft and thereby drive the compressor.

14. The aircraft of claim 12, wherein the propulsion system further comprises:

a motor control in communication with the electric motor; and a system controller in communication with the EPMC, the motor control, and a memory device storing instructions.

15. The aircraft of claim 12, wherein the electric generator is configurable as a motor/generator, and as said motor/generator configurable in a first mode to function as said electric generator and produce the electrical power and in a second mode to function as an electric motor to provide motive force; and wherein a motor control is configurable to control the motor/generator to selectively operate in the first mode and the second mode, and in the second mode, the motor/generator is operable to provide motive force to the compressor.

16. The aircraft of claim 12, wherein the electric generator includes a first electric generator and a second electric generator; and wherein the compressor includes a first compressor and a second compressor; and wherein the turbine includes a first turbine and a second turbine, and the first turbine is in communication with and configured to power the first compressor and the first electric generator, and the second turbine is in communication with and configured to power the second compressor and the second electric generator; and wherein the system is configured such that the first compressor, or the second compressor, or both, are configured to produce the flow of compressor air to the IC engine; and wherein the system is configured such that the first turbine, or the second turbine, or both, are configured to be powered by the exhaust gas flow from the IC engine; and the electric motor includes a first electric motor and a second electric motor, and the first electric motor is powered by the electrical power produced by the first electric generator, or the first electric motor is powered by the electrical power produced by the second electric generator, or the first electric motor is powered by the electrical power produced by both the first electric generator and the second electric generator.

17. The aircraft of claim 16, wherein the IC engine, the first electric motor, and the second electric motor are configured to selectively provide motive force to the MPMD.

* * * * *